US012780634B2

(12) United States Patent
Hasegawa

(10) Patent No.: US 12,780,634 B2
(45) Date of Patent: Nov. 3, 2026

(54) CARGO-HANDLING LIMITING DEVICE AND CARGO-HANDLING LIMITING METHOD

(71) Applicant: KABUSHIKI KAISHA TOYOTA JIDOSHOKKI, Kariya (JP)

(72) Inventor: Kimihide Hasegawa, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 85 days.

(21) Appl. No.: 18/839,562

(22) PCT Filed: Feb. 21, 2023

(86) PCT No.: PCT/JP2023/006114

§ 371 (c)(1),
(2) Date: Aug. 19, 2024

(87) PCT Pub. No.: WO2023/162948

PCT Pub. Date: Aug. 31, 2023

(65) Prior Publication Data

US 2025/0162852 A1 May 22, 2025

(30) Foreign Application Priority Data

Feb. 22, 2022 (JP) ................................. 2022-025961

(51) Int. Cl.
*B66F 17/00* (2006.01)
*B66F 9/075* (2006.01)
(Continued)

(52) U.S. Cl.
CPC .......... *B66F 17/003* (2013.01); *B66F 9/0759* (2013.01); *B66F 9/082* (2013.01); *B66F 9/22* (2013.01)

(58) Field of Classification Search
CPC ...... B66F 17/003; B66F 9/0759; B66F 9/082; B66F 9/22; B66F 9/24; F02D 41/0205;
(Continued)

(56) References Cited

U.S. PATENT DOCUMENTS

2014/0324322 A1* 10/2014 Yoshida .................. F01N 11/00
701/104
2017/0274904 A1 9/2017 Koide et al.

FOREIGN PATENT DOCUMENTS

JP 2017-172553 A 9/2017

OTHER PUBLICATIONS

Swetha, Annam, and Sasikumar Punnekkat. "Design, analysis and implementation of improved adaptive fault tolerant model for cruise control multiprocessor system." International Journal of computer applications 86.15 (2014). (Year: 2014).*

(Continued)

*Primary Examiner* — Alan D Hutchinson
(74) *Attorney, Agent, or Firm* — Sughrue Mion, PLLC

(57) ABSTRACT

A material handling limitation device for a forklift including an engine and a material handling device is provided. The material handling limitation device includes a vehicle speed sensor configured to output a signal corresponding to a vehicle speed of the forklift, an accelerator sensor configured to output a signal corresponding to an operation amount of an accelerator pedal, and a processing circuitry configured to calculate the vehicle speed based on the signal from the vehicle speed sensor, execute a vehicle speed limiting process that limits the vehicle speed based on at least the vehicle speed, and execute, in a case where an anomaly related to the vehicle speed limiting process has occurred, a traveling process that controls a rotational speed of the engine based
(Continued)

on the signal from the accelerator sensor and a material handling limitation process that limits operation of the material handling device.

10 Claims, 4 Drawing Sheets

(51) Int. Cl.
*B66F 9/08* (2006.01)
*B66F 9/22* (2006.01)

(58) Field of Classification Search
CPC ................ F02D 31/006; F02D 31/009; F02D 2200/602; F02D 41/22; F02D 29/02; F02D 2200/501; F02D 2250/26
See application file for complete search history.

(56) References Cited

OTHER PUBLICATIONS

International Search Report for PCT/JP2023/006114 dated Apr. 4, 2023 (PCT/ISA/210).

* cited by examiner

CARGO-HANDLING LIMITING DEVICE AND CARGO-HANDLING LIMITING METHOD

CROSS-REFERENCE TO RELATED APPLICATIONS

This application is national stage application of International Application No. PCT/JP2023/006114, filed on Feb. 21, 2023, claiming priority based on Japanese Patent Application No. 2022-025961 filed Feb. 22, 2022.

TECHNICAL FIELD

The present disclosure relates to a material handling limitation device and a material handling limitation method.

BACKGROUND ART

Patent Literature 1 discloses a vehicle speed limiting device.

The vehicle speed limiting device includes a vehicle controller, an engine controller, an accelerator sensor, and a vehicle speed sensor. The vehicle speed limiting device limits the vehicle speed of the forklift in an eco mode. The vehicle controller calculates the operation amount of the accelerator pedal based on signals output from the accelerator sensor. The vehicle controller calculates a target speed of the forklift based on the operation amount of the accelerator pedal. The vehicle controller calculates the vehicle speed of the forklift based on signals output from the vehicle speed sensor.

In the eco mode, the vehicle controller compares the target vehicle speed with a vehicle speed limit value. The vehicle controller replaces the target vehicle speed with the vehicle speed limit value when the target vehicle speed exceeds the vehicle speed limit value. When the target vehicle speed is replaced with the vehicle speed limit value, the vehicle controller calculates a target rotational speed of the engine based on the deviation between the vehicle speed limit value and the vehicle speed. The vehicle controller outputs the target rotational speed as a rotational speed command value to the engine controller. The engine controller controls the engine to achieve the target rotational speed that is based on the vehicle speed limit value. Thus, the vehicle speed of the forklift is limited.

CITATION LIST

Patent Literature

Patent Literature 1: Japanese Laid-Open Patent Publication No. 2017-172553

SUMMARY OF INVENTION

Technical Problem

In the above configuration, for example, if an anomaly occurs in the vehicle speed sensor or if there is a communication failure between the vehicle controller and the engine controller, the vehicle speed of the forklift will not be properly limited. Thus, a method for notifying the forklift operator of the improper execution of the vehicle speed limitation to encourage the operator to perform an inspection may be a possible solution.

However, depending on the means for notification, there is a risk that the occurrence of an anomaly may not be communicated to the operator, resulting in the operator continuing to work without the vehicle speed limitation being properly executed. In this case, limiting the work of the forklift by limiting the rotational speed of the engine to the target rotational speed based on the vehicle speed limit value by the engine controller may be another solution. However, if the rotational speed of the engine is limited, it may be difficult to move the forklift to a repair site.

Solution to Problem

An aspect of the present disclosure provides a material handling limitation device for a forklift. The forklift includes an engine and a material handling device. The material handling limitation device includes a vehicle speed sensor configured to output a signal corresponding to a vehicle speed of the forklift, an accelerator sensor configured to output a signal corresponding to an operation amount of an accelerator pedal, and a controller configured to calculate the vehicle speed based on the signal from the vehicle speed sensor and execute a vehicle speed limiting process that limits the vehicle speed based on at least the vehicle speed. The controller is configured to execute, in a case where an anomaly related to the vehicle speed limiting process has occurred, a traveling process that controls a rotational speed of the engine based on the signal from the accelerator sensor and a material handling limitation process that limits operation of the material handling device.

Another aspect of the present disclosure provides a material handling limitation method for a forklift. The forklift includes an engine and a material handling device. The material handling limitation method includes calculating a vehicle speed of the forklift based on a signal corresponding to the vehicle speed, executing a vehicle speed limiting process that limits the vehicle speed based on at least the vehicle speed and executing, in a case where an anomaly related to the vehicle speed limiting process has occurred, a traveling process that controls a rotational speed of the engine based on a signal corresponding to an operation amount of an accelerator pedal and a material handling limitation process that limits operation of the material handling device.

DESCRIPTION OF EMBODIMENTS

A material handling limitation device according to an embodiment will now be described with reference to FIGS. 1 to 5.

Configuration of Forklift

Figure 1:
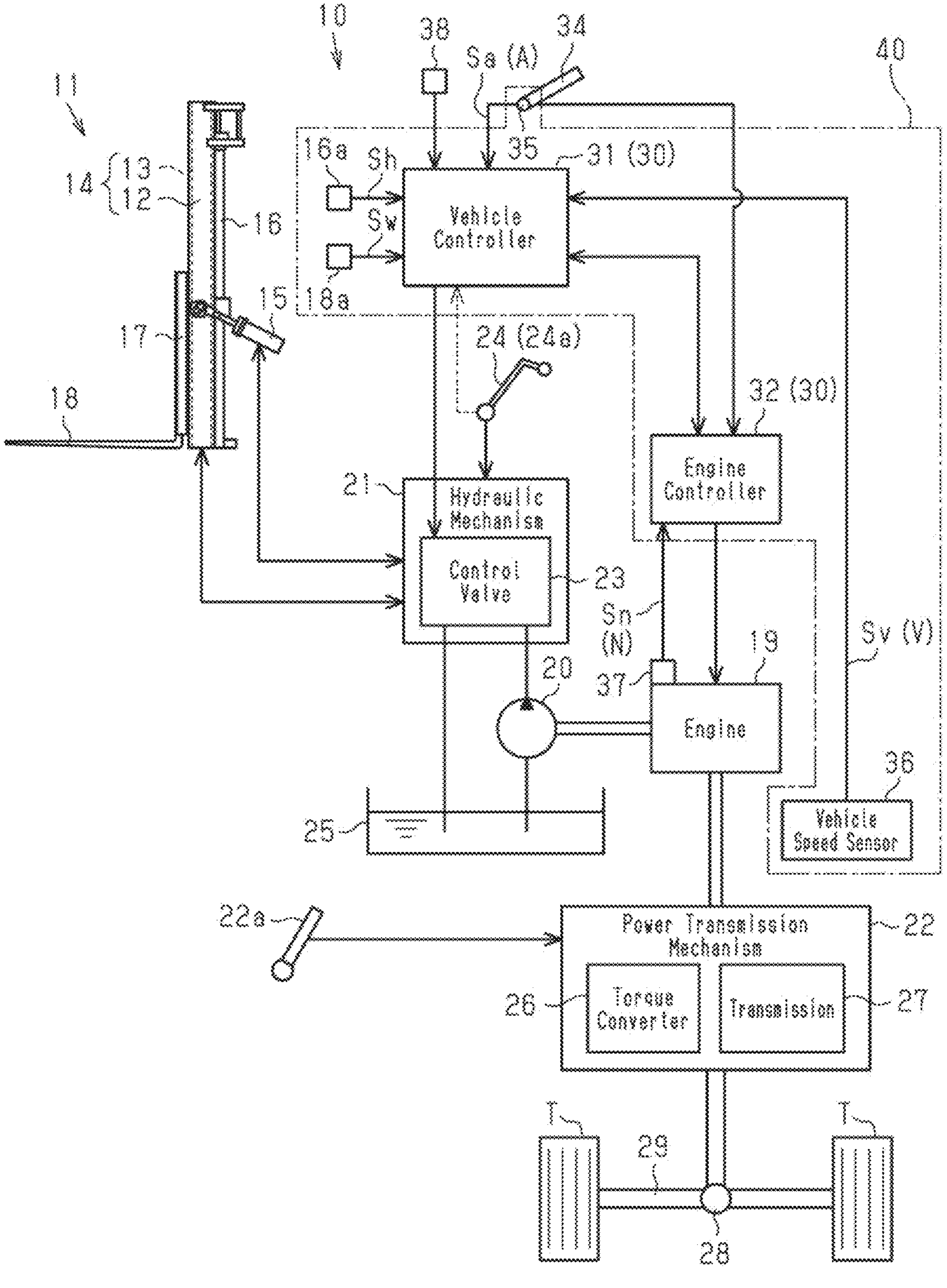
FIG. 1 is a schematic diagram of a forklift according to an embodiment.

As shown in FIG. 1, the forklift 10 includes a material handling device 11. The material handling device 11 includes a mast 14, tilt cylinders 15, lift cylinders 16, a lift bracket 17, and forks 18.

The mast 14 includes an outer mast 12 and an inner mast 13. The tilt cylinders 15 are coupled to the outer mast 12. The lift cylinders 16 are coupled to the inner mast 13.

By supplying or discharging hydraulic oil to and from the tilt cylinders 15, the mast 14 tilts forward or backward. By supplying or discharging hydraulic oil to and from the lift cylinders 16, the inner mast 13 moves vertically. The forks 18 are attached to the inner masts 13 with the lift bracket 17. As the inner mast 13 moves vertically, the forks 18 move vertically along with the lift bracket 17.

The forklift 10 includes an engine 19, a hydraulic pump 20, a hydraulic mechanism 21, a power transmission mechanism 22, a material handling operation member 24, and an oil tank 25. The hydraulic pump 20 supplies the hydraulic oil stored in the oil tank 25 to the hydraulic mechanism 21. The engine 19 serves as a drive source for traveling and material handling of the forklift 10.

The hydraulic mechanism 21 includes a control valve 23. The hydraulic pump 20 is driven by the engine 19. The control valve 23 is a hydraulic actuator that regulates the flow rate of hydraulic oil supplied to and discharged from each of the tilt cylinders 15 and the lift cylinders 16. In the present embodiment, the lift cylinders 16 and the hydraulic mechanism 21 are included in a lift device that vertically moves the forks 18 using hydraulic pressure. The material handling device 11 includes at least the lift device.

The material handling operation member 24 is mechanically coupled to the control valve 23. The material handling operation member 24 is an operation lever used by an operator to control the movement of each of the tilt cylinders 15 and the lift cylinders 16. The material handling operation member 24 includes a lift lever 24*a* that actuates the lift device.

The control valve 23 switches between open and closed states through an operation of the material handling operation member 24. When the control valve 23 switches to the open state and the hydraulic pump 20 operates, the hydraulic oil from the oil tank 25 is supplied to each of the tilt cylinders 15 and the lift cylinders 16 through the hydraulic mechanism 21. Further, when the control valve 23 switches to the open state and the hydraulic pump 20 operates, the hydraulic oil is discharged from each of the tilt cylinders 15 and the lift cylinders 16. The hydraulic oil discharged from each of the tilt cylinders 15 and the lift cylinders 16 is returned to the oil tank 25 through the hydraulic mechanism 21.

The power transmission mechanism 22 includes a torque converter 26 and a transmission 27. An axle 29 is coupled to the engine 19 via the power transmission mechanism 22 and a differential gear 28. Drive wheels T are coupled to the axle 29. The power of the engine 19 is transmitted to the drive wheels T through the power transmission mechanism 22, the differential gear 28, and the axle 29.

The forklift 10 includes an inching pedal 22*a*, an accelerator pedal 34, an accelerator sensor 35, a vehicle speed sensor 36, a rotational speed sensor 37, and a mode switch 38.

The inching pedal 22*a* is installed in the operator's seat of the forklift 10. The inching pedal 22*a* is configured to be interlocked with the brake pedal (not shown) provided at the operator's seat according to its operation amount. Whereas the inching pedal 22*a* is operated independently from (i.e., is not interlocked with) the brake pedal in an inching region, the inching pedal 22*a* is interlocked with the brake pedal in a braking region. The inching region refers to a region in which the inching pedal 22*a* is depressed and the clutch is partially engaged. The braking region refers to a region in which braking force is applied to the forklift 10.

The accelerator sensor 35 is used to output a signal Sa corresponding to an operation amount A of the accelerator pedal 34. The vehicle speed sensor 36 is used to output a signal Sv corresponding to the vehicle speed V of the forklift 10. The rotational speed sensor 37 is used to output a signal Sn corresponding to a rotational speed N of the engine 19.

The mode switch 38 is used to switch the travel mode of the forklift 10 between a normal mode and an eco mode. The normal mode is a travel mode in which an upper limit value is not set for the vehicle speed V of the forklift 10 and the speed of the forklift 10 can be set to the vehicle speed V corresponding to the accelerator operation performed by the operator. The eco mode is a travel mode in which the upper limit value is set for the vehicle speed V of the forklift 10 and the vehicle speed V is restricted from being greater than the upper limit value so that the fuel economy is improved. The mode switch 38 outputs a signal corresponding to the travel mode selected by the operator.

The forklift 10 includes a lift height sensor 16*a* and a load sensor 18*a*. The lift height sensor 16*a* is used to output a signal Sh corresponding to a height H of the fork 18. The load sensor 18*a* is used to output a signal Sw corresponding to a load W of a material loaded on the fork 18.

The forklift 10 includes a controller 30. The controller 30 includes a vehicle controller 31 and an engine controller 32. The vehicle controller 31 and the engine controller 32 are electrically connected to each other. The vehicle controller 31 and the engine controller 32 monitor the communication status of each other.

The vehicle controller 31 is electrically connected to each of the control valve 23, the mode switch 38, the accelerator sensor 35, and the vehicle speed sensor 36. The vehicle controller 31 is electrically connected to each of the lift height sensor 16*a* and the load sensor 18*a*. The vehicle controller 31 receives the signal from the mode switch 38 and the signals Sa, Sv, Sh, and Sw from the sensors 35, 36, 16*a*, and 18*a*.

The engine controller 32 is electrically connected to each of the accelerator sensor

35 and the rotational speed sensor 37. The engine controller 32 receives the signal Sa from the accelerator sensor 35 and the signal Sn from the rotational speed sensor 37. The engine controller 32 obtains the rotational speed N of the engine 19 from the received signal Sn. The engine controller 32 sends the information related to the rotational speed N to the vehicle controller 31. In the present embodiment, the lift height sensor 16*a*, load sensor 18*a*, accelerator sensor 35, vehicle speed sensor 36, and controller 30 are included in a material handling limitation device 40.

The vehicle controller 31 and the engine controller 32 each include a processor (not shown), such as a CPU or GPU, and a memory (not shown) that includes, for example, a RAM and a ROM. The memory stores program codes or instructions configured to cause the processor to execute processes. The memory, which is a computer-readable medium, includes any type of medium that is accessible by a general-purpose computer or a dedicated computer. The vehicle controller 31 and the engine controller 32 may each include a hardware circuit such as an application-specific integrated circuit (ASIC) and a field-programmable gate array (FPGA). The vehicle controller 31 and the engine controller 32, which are processing circuitry, may each include one or more processors that operate according to a computer program, one or more hardware circuits such as an ASIC and a FPGA, or a combination thereof. The memory of the vehicle controller 31 stores an upper limit value VU of the vehicle speed V in the eco mode.

The vehicle controller 31 controls the control valve 23 by having the processor execute a program stored in the memory. The engine controller 32 controls the engine 19 by having the processor execute a program stored in the memory. This enables the forklift 10 to travel and enables the lift cylinders 16 and the tilt cylinders 15 to operate.

Normal Mode and Eco Mode

The vehicle speed control executed by the vehicle controller 31 in the normal mode will now be described.

The vehicle controller 31 obtains the operation amount A of the accelerator pedal 34 from the signal Sa of the accelerator sensor 35. The vehicle controller 31 calculates a target vehicle speed V* from the obtained operation amount A of the accelerator pedal 34. The vehicle controller 31 obtains an actual vehicle speed V of the forklift 10 from the signal Sv of the vehicle speed sensor 36. The vehicle controller 31 calculates a target rotational speed N* of the engine 19 based on the deviation between the target vehicle speed V* and the vehicle speed V. The vehicle controller 31 outputs the target rotational speed N* as a rotational speed command to the engine controller 32. Upon receipt of the rotational speed command, the engine controller 32 controls the engine 19 such that the rotational speed N of the engine 19 reaches the target rotational speed N*. In other words, the engine controller 32 controls the engine 19 such that the vehicle speed V of the forklift 10 follows the target vehicle speed V*.

The vehicle speed control executed by the vehicle controller 31 in the eco mode will now be described.

The vehicle controller 31 calculates the target vehicle speed V* in the same manner as in the normal mode. The vehicle controller 31 compares the target vehicle speed V* with the upper limit value VU of the vehicle speed V stored in the memory. In a case where the target vehicle speed V* is less than or equal to the upper limit value VU, the vehicle controller 31 calculates the target rotational speed N* based on the deviation between the target vehicle speed V* and the vehicle speed V.

In a case where the target vehicle speed V* is greater than the upper limit value VU, the vehicle controller 31 replaces the target vehicle speed V* with the upper limit value VU. After calculating the target rotational speed N* based on the deviation between the target vehicle speed V*, which has been replaced with the upper limit value VU, and the vehicle speed V, the vehicle controller 31 outputs that target rotational speed N* to the engine controller 32. The engine controller 32, in the same manner as in the normal mode, controls the engine 19 such that the rotational speed N of the engine 19 reaches the target rotational speed N*. That is, in the eco mode, in a case where the target vehicle speed V* is greater than the upper limit value VU, the engine controller 32 controls the engine 19 such that the vehicle speed V of the forklift 10 reaches the upper limit value VU. That is, the controller 30 executes a vehicle speed limiting process based on at least the vehicle speed V.

Vehicle Speed Limit in Material Handling State

The vehicle controller 31 obtains the height H of the fork 18 based on the signal Sh from the lift height sensor 16*a*. The vehicle controller 31 obtains the load W of a material loaded on the fork 18, based on the signal Sw from the load sensor 18*a*. The state in which a material is loaded on the fork 18 is described as a material handling state.

Figure 2:
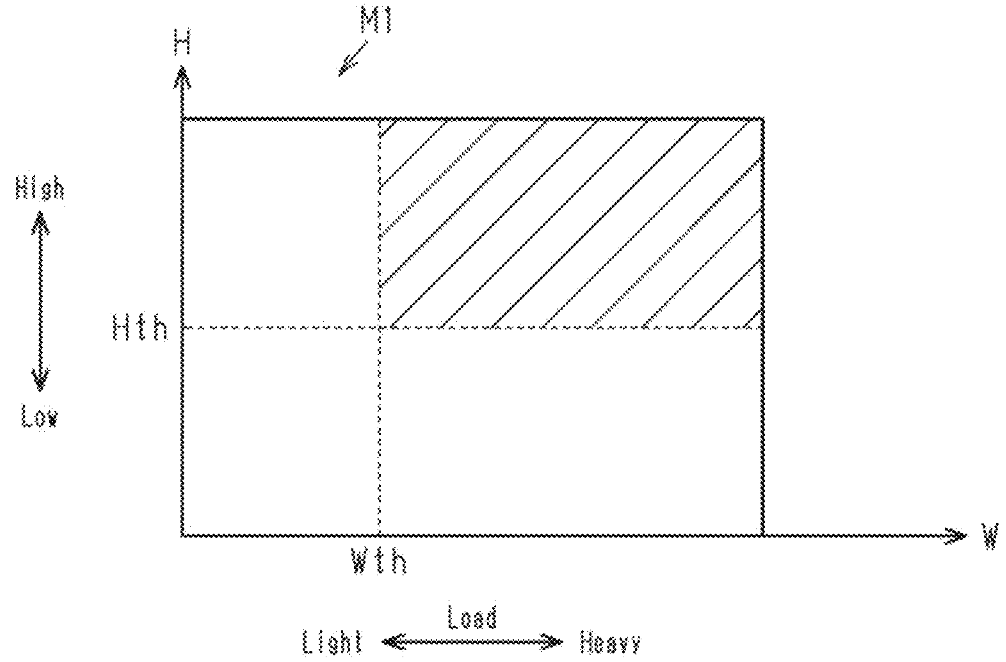
FIG. 2 is a graph illustrating the limit zone for the vehicle speed and the non-limit zone for the vehicle speed in the material handling state of the forklift shown in FIG. 1.
Figure 3:
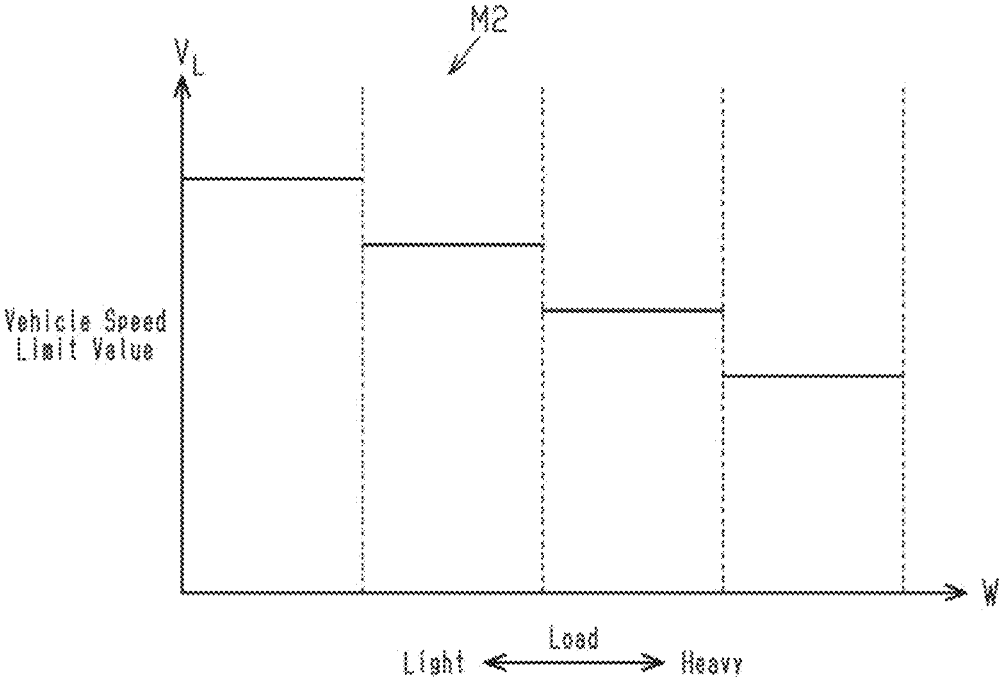
FIG. 3 is a graph illustrating the relationship between the load and the vehicle speed limit value of the forklift shown in FIG. 1.

As shown in FIG. 2, the vehicle controller 31 matches the obtained value of the height H and the obtained value of the load W with a map M1. The map M1 depicts a limit zone for the vehicle speed V and a non-limit zone for the vehicle speed V in the material handling state. The horizontal axis of the map M1 represents the value of the load W, and the vertical axis of the map M1 represents the value of the height H. The map M1 is stored in the memory of the vehicle controller 31.

The vehicle controller 31 refers to the map M1 to determine whether the vehicle speed V of the forklift 10 needs to be limited based on the height H and the load W obtained in the material handling state. In a range in which the value of the load W is greater than a load threshold value Wth and the value of the height H is greater than a height threshold value Hth (indicated by the hatched area in FIG. 2), the vehicle controller 31 determines that the vehicle speed V needs to be limited. In the map M1, the range in which the value of the load W is greater than the load threshold value Wth and the value of the height H is greater than the height threshold value Hth (indicated by the hatched area in FIG. 2), is the limit zone for the vehicle speed V.

In a range in which the value of the load W is less than or equal to the load threshold value Wth and in a range in which the value of the load W is greater than the load threshold value Wth and the value of the height H is less than or equal to the height threshold value Hth, the vehicle controller 31 determines that the vehicle speed V does not need to be limited. In the map M1, the range in which the value of the load W is less than or equal to the load threshold value Wth and in a range in which the value of the load W is greater than the load threshold value Wth and the value of the height H is less than or equal to the height threshold value Hth, is the non-limit zone for the vehicle speed V. The load threshold value Wth is set after confirming in advance that the material on the fork 18 will not shift when the forklift 10 is driven with the material on the fork 18. The height threshold value Hth is set after confirming in advance that the traveling state of the forklift 10 will not become unstable due to the material on the fork 18 when the forklift 10 is driven with the material on the fork 18.

In a case where the vehicle controller 31 determines that the vehicle speed V needs to be limited in the material handling state, the vehicle controller 31 refers to a map M2 to calculate a vehicle speed limit value VL from the obtained load W. The map M2 illustrates the relationship between the value of the load W and the vehicle speed limit value VL. The horizontal axis of the map M2 represents the value of the load W, and the vertical axis of the map M2 represents the vehicle speed limit value VL. The map M2 is stored in the memory of the vehicle controller 31. The map M2 is set such that the vehicle speed limit value VL stepwise decreases as the value of the load W increases. In a case where the vehicle controller 31 determines that the vehicle speed V needs to be limited in the material handling state, the vehicle controller 31 calculates the vehicle speed limit value VL from the map M2.

In a case where the vehicle controller 31 determines that the vehicle speed V does not need to be limited in the material handling state, the vehicle controller 31 calculates the target rotational speed N* based on the deviation between the vehicle speed V and the target vehicle speed V*, which is calculated based on the signal Sa from the accelerator sensor 35.

The vehicle controller 31 outputs that target rotational speed N* to the engine controller 32. In a case where the vehicle controller 31 determines that the vehicle speed V needs to be limited in the material handling state, the vehicle controller 31 compares the target vehicle speed V* with the vehicle speed limit value VL. In a case where the target vehicle speed V* is less than or equal to the vehicle speed limit value VL, the vehicle controller 31 calculates the target rotational speed N* based on the deviation between the target vehicle speed V* and the vehicle speed V. The vehicle controller 31 outputs that target rotational speed N* to the engine controller 32. In a case where the target vehicle speed V* is greater than the vehicle speed limit value VL, the vehicle controller 31 replaces the target vehicle speed V* with the vehicle speed limit value VL. The vehicle controller 31 outputs, to the engine controller 32, the target rotational speed N* that has been calculated based on the deviation between the new target vehicle speed V* and the vehicle speed V.

Thus, in a case where the vehicle speed V needs to be limited in the material handling state, the engine controller 32 controls the engine 19 such that the vehicle speed V of the forklift 10 reaches the vehicle speed limit value VL. That is, the controller 30 executes the vehicle speed limiting process based on at least the vehicle speed V.

Routine of Controller

The routine executed by the controller 30 will now be described. The controller 30 executes this routine at predetermined intervals. The routine executed by the controller 30 is executed by having the processor execute a program stored in the memory.

Figure 4:
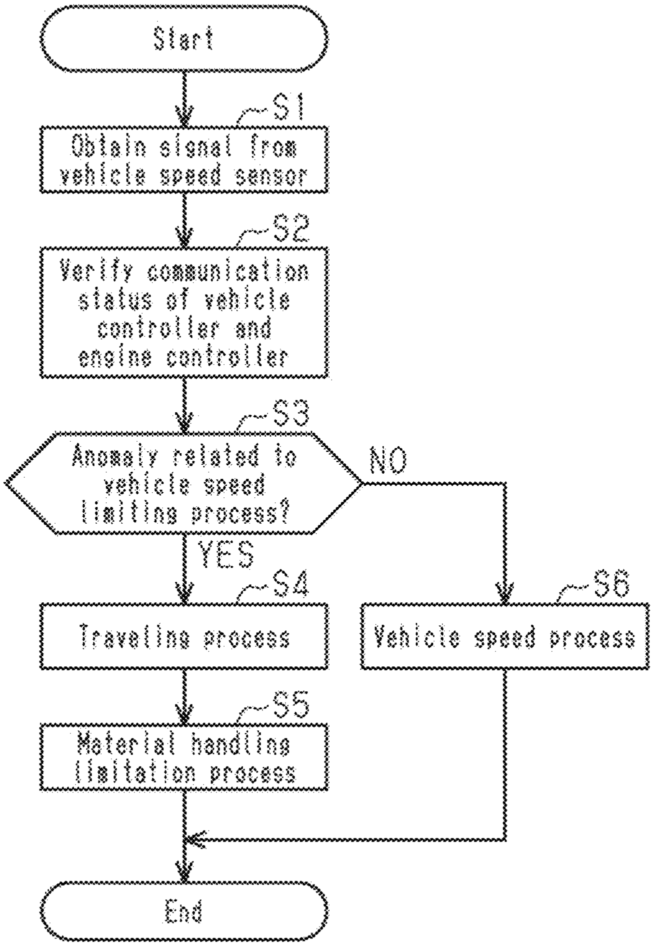
FIG. 4 is a flowchart illustrating a process executed by the material handling limitation device of the forklift shown in FIG. 1.

As shown in FIG. 4, when starting the routine, the controller 30 obtains the signal Sv from the vehicle speed sensor 36 in step S1. After executing the process of step S1, the controller 30 advances the process to step S2.

The controller 30 verifies the communication status between the vehicle controller 31 and the engine controller 32 in the process of step S2. In the process of step S2, the vehicle controller 31 and the engine controller 32 verify whether there are no anomalies in their communication status. After executing the process of step S2, the controller 30 advances the process to step S3.

The controller 30 determines whether an anomaly related to the vehicle speed limiting process has occurred in the process of step S3. The anomaly related to the vehicle speed limiting process includes two types of anomalies; specifically, an anomaly in the communication status between the vehicle controller 31 and the engine controller 32, and an anomaly in the vehicle speed sensor 36.

In a case where the vehicle controller 31 has not received information related to the rotational speed N from the engine controller 32, the vehicle controller 31 determines that an anomaly has occurred in the communication status between the vehicle controller 31 and the engine controller 32. In a case where the engine controller 32 has not received information related to the target rotational speed N* from the vehicle controller 31, the engine controller 32 determines that an anomaly has occurred in the communication status between the vehicle controller 31 and the engine controller 32. In other words, in a case where there is no transmission of at least one of the information related to the rotational speed N and the information related to the target rotational speed N*, the controller 30 determines that an anomaly has occurred in the communication status between the vehicle controller 31 and the engine controller 32.

For an anomaly in the vehicle speed sensor 36, the vehicle controller 31 determines whether the signal Sv from the vehicle speed sensor 36 has been received. In a case where the vehicle controller 31 has not received the signal Sv from the vehicle speed sensor 36, the vehicle controller 31 determines that an anomaly has occurred in the vehicle speed sensor 36. In a case where the vehicle controller 31 has received the signal Sv from the vehicle speed sensor 36, the vehicle controller 31 determines that an anomaly has not occurred in the vehicle speed sensor 36.

In a case where at least one of the anomaly in the vehicle speed sensor 36 and the anomaly in the communication status between the vehicle controller 31 and the engine controller 32 has occurred, the controller 30 cannot properly execute the vehicle speed limiting process. Thus, in a case where at least one of the anomaly in the vehicle speed sensor 36 and the anomaly in the communication status between the vehicle controller 31 and the engine controller 32 has occurred, the controller 30 determines that an anomaly related to the vehicle speed limiting process has occurred (YES in step S3).

In a case where both of the anomaly in the vehicle speed sensor 36 and the anomaly in the communication status between the vehicle controller 31 and the engine controller 32 have not occurred, the controller 30 determines that an anomaly related to the vehicle speed limiting process has not occurred (NO in step S3).

In a case where the determination in step S3 is YES, the controller 30 advances the process to step S4. In a case where the determination in step S3 is NO, the controller 30 advances the process to step S6. In the process of step S6, the controller 30 executes a vehicle speed process. Hereinafter, step S6 will be referred to as the vehicle speed process S6. The vehicle speed process S6 involves the procedures described for the aforementioned normal mode, eco mode, and vehicle speed limitation in the material handling state. After executing the vehicle speed process S6, the controller 30 terminates the routine.

In the process of step S4, the controller 30 executes a traveling process. Hereinafter, step S4 will be referred to as the traveling process S4. In the traveling process S4, the engine controller 32 controls the engine 19 in accordance with the operation amount A of the accelerator pedal 34. In the traveling process S4, the rotational speed N of the engine 19 is controlled based on the signal Sa from the accelerator sensor 35. In the traveling process S4, the engine controller 32 independently controls the engine 19, separate from the vehicle controller 31. In other words, in a case where the vehicle speed limiting process cannot be properly executed due to an anomaly related to the vehicle speed limiting process, the controller 30 executes the traveling process S4. In the traveling process S4, the forklift 10 can travel at a vehicle speed corresponding to the operation amount A of the accelerator pedal 34, without any limit being imposed on the vehicle speed. Thus, even in a case where the vehicle speed limiting process cannot be properly executed, the traveling process S4 allows the forklift 10 to travel at a vehicle speed corresponding to the operation amount A of the accelerator pedal 34. After executing the traveling process S4, the controller 30 advances the process to step S5.

In the process of step S5, the controller 30 executes a material handling limitation process. Hereinafter, step S5 will be referred to as the material handling limitation process S5. In the material handling limitation process S5, some of the movements of the material handling device 11 are limited. After executing the material handling limitation process S5, the controller 30 terminates the routine.

Material Handling Limitation Process

In the material handling limitation process S5, the vehicle controller 31 controls the control valve 23 to limit the supply and discharge of hydraulic oil to and from the lift cylinder 16, thereby limiting some movements of the fork 18. That is, in the material handling limitation process S5, some movements of the fork 18 are limited in a case where an anomaly related to the vehicle speed limiting process has occurred.

The material handling limitation process S5 includes a lowering non-limitation process, a raising permission process S51, a raising prohibition process S52, and a standby process S53.

In the lowering non-limitation process, the lowering of the fork 18 is not limited even when the fork 18 in the material handling state is being raised, allowing the material to be unloaded from the fork 18. The lowering non-limitation process is executed when the lift lever 24*a* is operated to lower the fork 18. In the lowering non-limitation process, the vehicle controller 31 keeps the control valve 23 constantly open. During the execution of the lowering non-limitation process, the operation of the hydraulic pump 20 is unaffected. Thus, in the lowering non-limitation process, the discharge of hydraulic oil from the lift cylinder 16 is not limited by the control valve 23. Some movements of the fork 18 limited by the material handling limitation process S5 in the present embodiment include the rise of the fork 18.

The raising permission process S51 is executed in a case where the lift lever 24*a* starts to be operated to raise the fork 18 during the standby process S53, which will be described later. In the raising permission process S51, the vehicle controller 31 sets the control valve 23 to the open state for a fixed period of time Δt1. In this situation, the hydraulic pump 20 is actuated because the accelerator pedal 34 is depressed. In the raising permission process S51, the vehicle controller 31 raises the fork 18 by controlling the control valve 23 to permit the supply of hydraulic oil to the lift cylinder 16 for the fixed period of time Δt1. The fixed period of time Δt1 in the raising permission process S51 is, for example, one second.

When the lift lever 24*a* is operated to lower the fork 18 during the execution of the raising permission process S51, the raising permission process S51 is canceled and then switched to the lowering non-limitation process. That is, the raising permission process S51 is executed for the fixed period of time Δt1 at maximum. After the raising permission process S51 is executed for the fixed period of time Δt1, the raising prohibition process S52 is executed. In a case where a state in which the lift lever 24*a* is operated switches to a state in which the lift lever 24*a* is not operated before the raising permission process 51 continues for the fixed period of time Δt1, the standby process S53 is executed.

Immediately after the raising permission process S51 ends in a state in which the lift lever 24*a* is operated to raise the fork 18, the raising prohibition process S52 is executed.

In the raising prohibition process S52, the vehicle controller 31 keeps the control valve 23 closed for a fixed period of time Δt2. As a result, even if the accelerator pedal 34 is depressed by the occupant so that the hydraulic oil is discharged from the hydraulic pump 20, the hydraulic oil will not be supplied to the lift cylinder 16.

In the raising prohibition process S52, the vehicle controller 31 prohibits the fork 18 from being raised by controlling the control valve 23 to stop supplying hydraulic oil to the lift cylinder 16 for the fixed period of time Δt2.

The fixed period of time Δt2 in the raising prohibition process S52 is longer than the fixed period of time Δt1 in the raising permission process S51. The fixed period of time Δt2 in the raising prohibition process S52 is, for example, five seconds. The fixed period of time Δt2 in the raising prohibition process S52 may be adjusted as necessary to create a sense of unease in a material handling task when the operator intends to raise the fork 18 (i.e., when the operator is operating the lift lever 24*a* to lift the fork 18). In other words, the fixed period of time Δt2 in the raising prohibition process S52 may be shorter than the fixed period of time Δt1 in the raising permission process S51.

When the lift lever 24*a* is operated to lower the fork 18 during the execution of the raising prohibition process S52, the raising prohibition process S52 is canceled and then switched to the lowering non-limitation process. That is, the raising prohibition process S52 is executed for the fixed period of time Δt2 at maximum. After the raising prohibition process S52 is executed over the fixed period of time Δt2, the standby process S53 is executed. In other words, the standby process S53 is executed at the point in time when the raising prohibition process S52 is completed.

The standby process S53 is a process that switches to the raising permission process S51 in a case where the lift lever 24*a* starts to be operated to raise the fork 18 during the execution of the standby process S53. That is, in the standby process S53, a standby time is set from immediately after the completion of the raising prohibition process S52 to the start of the raising permission process S51.

Also, the standby process S53 is executed in a case where the raising prohibition process S52 ends with the lift lever 24*a* operated to raise the fork 18 during the execution of the raising prohibition process S52 and the lift lever 24*a* continues to be operated. In this case, the vehicle controller 31 does not raise the fork 18 during the standby process S53. That is, in the standby process S53, in a case where the raising prohibition process S52 is completed with the lift lever 24*a* continuing to be operated since the execution of the raising prohibition process S52, the fork 18 will not be raised. In the standby process S53, only the operation of the lift lever 24*a* performed after the completion of the raising prohibition process S52 is accepted. When the lift lever 24*a* is operated to lower the fork 18 during the execution of the standby process S53, the standby process S53 is canceled and then switched to the lowering non-limitation process. That is, the standby process S53 is also a process that switches to the lowering non-limitation process in a case where the fork 18 is lowered to operate the lift lever 24*a*.

At the point in time when an anomaly related to the vehicle speed limiting process occurs, the controller 30 executes the standby process S53. That is, the standby process S53 is also executed at the point in time when the vehicle speed limiting process becomes unable to be properly executed. In the standby process S53, if the lift lever 24*a* has been operated at the point in time when an anomaly related to the vehicle speed limiting process occurs, its operating state is maintained. In other words, even if the vehicle speed limiting process becomes unable to be properly executed while the fork 18 is rising, the standby process S53 permits the fork 18 to rise while the lift lever 24*a* continues to be operated. Specifically, in the standby process S53, the vehicle controller 31 controls the control valve 23 to permit the supply of hydraulic oil to the lift cylinder 16, thereby continuing to raise the fork 18.

Figure 5:
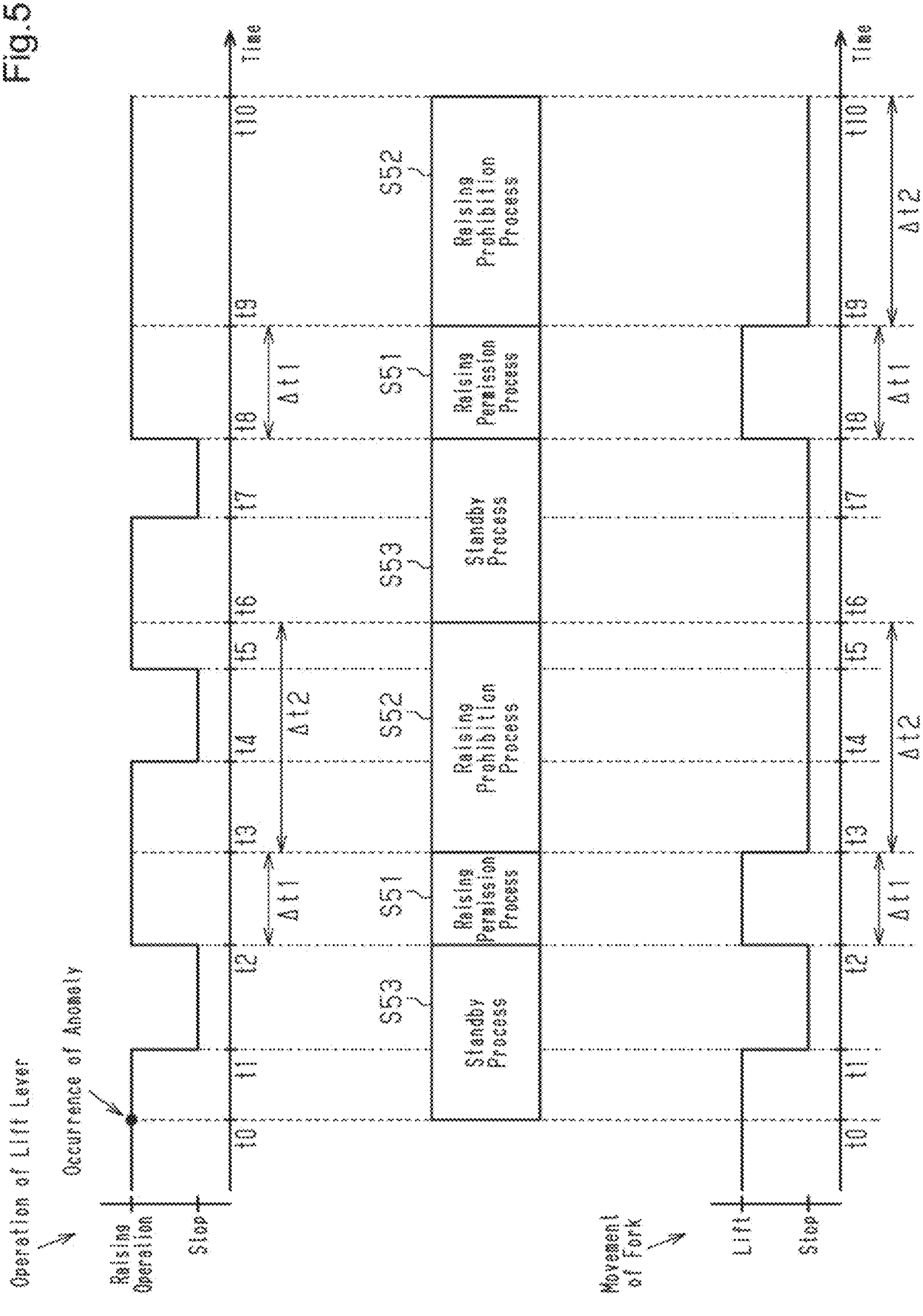
FIG. 5 is a diagram illustrating the relationship between the operation of the lift lever, the material handling limitation process, and the actual movement of the fork in the forklift of FIG. 1.

As shown in FIG. 5, in a case where only the operation of the lift lever 24*a* to raise the fork 18 is considered, the material handling limitation process S5 is executed by repeating the standby process S53, the raising permission process S51, and the raising prohibition process S52 in this order.

The fixed period of time Δt1 in the raising permission process S51 will now be described.

For example, in a case where the raising permission process S51 is executed, a material may be loaded on the fork 18. As the fixed period of time Δt1 in the raising permission process S51 increases, the flow rate of hydraulic oil flowing into the lift cylinder 16 increases. As the flow rate of hydraulic oil flowing into the lift cylinder 16 increases, the speed of the fork 18 increases. When the raising prohibition process S52 is executed while the speed of the fork 18 is relatively high, there is a risk of the load shifting on the fork 18. Thus, the fixed period of time Δt1 in the raising permission process S51 is set to ensure that the speed of the fork 18 will not become excessive. That is, the fixed period of time Δt1 in the raising permission process S51 is shorter than a period of time from when the fork 18 starts to rise to when the speed of the fork 18 reaches a speed at which the material on the fork 18 shifts.

Relationship Between Material Handling Limitation Process, Operation of Lift Lever, and Actual Movement of Fork FIG. 5 illustrates an example of the operation of the lift lever 24*a* and an example of the movement of the fork 18 when the material handling limitation process S5 is executed by the vehicle controller 31. The operation of lift lever 24*a*, described in FIG. 5, is an example that assumes only the raising or stopping of the fork 18.

In the example shown in FIG. 5, the operator of the forklift 10 operates the lift lever 24*a* as follows.

The operator operates the lift lever 24*a* to raise the fork 18 until time t1. At time t2, the operator begins to operate the lift lever 24*a* to raise the fork 18 again. The operator operates the lift lever 24*a* from time t2 until time t4, which is, for example, three seconds later. The operator begins to operate the lift lever 24*a* such that the fork 18 starts to rise again at time t5, which is, for example, one second after time t4. The operator operates the lift lever 24*a* from time t5 until time t7, which is, for example, two seconds later. The operator begins to operate the lift lever 24*a* to raise the fork 18 again from time t8. The operator continues to operate the lift lever 24*a* to raise the fork 18 from time t8.

For example, it is assumed that an anomaly related to the vehicle speed limiting process occurs at time t0, which is earlier than time t1. From time t0 to time t1, it is assumed that the lift lever 24*a* continues to be operated by the operator.

The movement of the fork 18 and the operator's perception of the material handling task, when the material handling limitation process S5 is executed in response to the above-described operation performed by the operator for the lift lever 24*a*, will now be explained.

In the material handling limitation process S5, the vehicle controller 31 executes the standby process S53 until time t2. Thus, even if an anomaly related to the vehicle speed limiting process occurs at time t0 when the fork 18 is rising, continuous operation of the lift lever 24*a* by the operator causes the fork 18 to continue rising. That is, from time t0 to time t1, the operator can safely perform the material handling task without experiencing any sense of unease.

Subsequently, when the lift lever 24*a* is operated by the operator at time t2, the vehicle controller 31 switches from the standby process S53 to the raising permission process S51. The operator continues to operate the lift lever 24*a* from time t2 to time t4. At time t3, which is one second after time t2, the vehicle controller 31 switches from the raising permission process S51 to the raising prohibition process S52. Thus, even if the operator continues to operate the lift lever 24*a* from time t2 to time t4, the fork 18 stops rising at time t3. That is, at time t3, the operator experiences a sense of unease in the material handling task and thus stops operating the lift lever 24*a* at time t4.

From time t3 to time t6, which is five seconds later, the vehicle controller 31 executes the raising prohibition process S52. Even if the operator starts operating the lift lever 24*a* at time t5, which is before time t6, the fork 18 remains stationary and not rise.

At time t6, the raising prohibition process S52 is completed. Then, the standby process S53 is executed by the vehicle controller 31. Even if the operator continues to operate the lift lever 24*a* from time t5 despite experiencing a sense of unease in the material handling task, the standby process S53 keeps the fork 18 stationary without rising.

Subsequently, the operator stops operating the lift lever 24*a* at time t7 due to experiencing a sense of unease in the material handling task. When the operator begins to operate the lift lever 24*a* again at time t8, the vehicle controller 31 switches from the standby process S53 to the raising permission process S51. Thus, when the operator begins to operate the lift lever 24*a* at time t8, the fork 18 rises.

At time t9, which is one second after time t8, the vehicle controller 31 switches from the raising permission process S51 to the raising prohibition process S52. The raising prohibition process S52 is executed by the vehicle controller 31 from time t8 to time t10, which is five seconds later. Thus, even if the operator continues to operate the lift lever 24*a* from time t8, the fork 18 stops rising at time t9. That is, even if the operator continues to operate the lift lever 24*a* after time t9 despite experiencing a sense of unease in the material handling task, the fork 18 does not rise.

Operation of Present Embodiment

The operation of the present embodiment will now be described.

In a case where an anomaly related to the vehicle speed limiting process has occurred, the material handling limitation process S5 limits the operation of the material handling device 11, thereby limiting the material handling task performed by the operator using the forklift 10. Thus, it becomes difficult to continue the material handling task without any limit on the vehicle speed V. Further, even when the operation of the material handling device 11 is limited, the forklift 10 can still travel without limiting the rotational speed of the engine 19 because of the execution of the traveling process S4.

Advantages of Present Embodiment

The advantages of the present embodiment will now be described.

(1) In a case where an anomaly related to the vehicle speed limiting process has occurred, the vehicle controller 31 executes the material handling limitation process S5 to limit the operation of the material handling device 11. Thus, it becomes difficult to continue the material handling task without any limit on the vehicle speed V. Further, even when the operation of the material handling device 11 is limited, the vehicle controller 31 executes the traveling process S4. Thus, the forklift 10 can still travel without limiting the rotational speed of the engine 19. Accordingly, while encouraging the operator to inspect the forklift 10, it becomes easier to move the forklift 10 to a repair site.

(2) For example, if the material handling device 11 completely stops operating while the fork 18 loaded with a material is rising, the material cannot be unloaded.

In the present embodiment, the material handling limitation process S5 includes the lowering non-limitation process. Thus, the execution of the lowering non-limitation process lowers the fork 18 even if it has a material. Accordingly, even if the material handling limitation process is executed while a material is loaded on the raised fork 18, the material can still be unloaded.

(3) The raising prohibition process S52 is executed immediately after the raising permission process S51. Thus, the operation of the forklift 10 is favorably limited in the event of an anomaly related to the vehicle speed limiting process. This creates a sense of unease in the material handling task for the operator, thereby encouraging the inspection of the forklift 10.

(4) Since the standby process S53 is executed, in a case where the operator has no intention to operate the lift lever 24*a*, the raising permission process S51 does not need to be executed. This reduces the processing load on the controller 30.

(5) In a case where an anomaly related to the vehicle speed limiting process has occurred, the standby process S53 is executed. Thus, the raising prohibition process S52 will not be executed immediately after an anomaly related to the vehicle speed limiting process occurs. Accordingly, for example, the fork 18 will not suddenly stop while it is rising. This reduces the risk of material shifting.

Additionally, after the raising prohibition process S52 is completed, the standby process S53 is executed. Thus, the raising permission process S51 will not be executed immediately after the raising prohibition process S52 without going through the standby process S53. Accordingly, for example, if the lift lever 24*a* continues to be operated during the execution of the raising prohibition process S52, the fork 18 will not rise at an unexpected moment for the operator when switching to the raising permission process S51.

(6) Even if an anomaly related to the vehicle speed limiting process occurs while the fork 18 is rising, the raising of the fork 18 is permitted by the standby process S53. As a result, the lift device will not stop suddenly. That is, the lift device can be stopped with the material handling task completed. Thus, material shifting will not be caused by the execution of the material handling limitation process.

(7) As the hydraulic pressure in the lift cylinder 16 increases, the rising speed of the fork 18 increases. In the present embodiment, depending on the setting of the fixed period of time Δt1 for executing the raising permission process S51, the speed of the fork 18 does not become excessive. Thus, even if the raising permission process S51 switches to the raising prohibition process S52 with a material loaded on the fork 18, material shifting is prevented.

(8) In the forklift 10, even if the connection between the vehicle speed sensor 36 and the vehicle controller 31 or the connection between the vehicle controller 31 and the engine controller 32 is disconnected to deactivate the limitation of the vehicle speed V, the operation of the material handling device 11 will be limited. Thus, unauthorized modifications performed by the operator to intentionally bypass the vehicle speed limiting process are prevented.

(9) To prevent unauthorized modifications by the operator to intentionally bypass the vehicle speed limiting process, the engine controller 32 may execute a process that limits the rotational speed N of the engine 19 in a case where an anomaly related to the vehicle speed limiting process has occurred. However, if the rotational speed N of the engine 19 is limited, it becomes difficult to move the forklift 10 to a repair site during an abnormal situation. Additionally, if the rotational speed N of the engine 19 is limited, the rotational speed N of the engine 19 cannot be increased to the desired rotational speed during standalone engine inspections. In other words, inspections of the engine 19, such as emission tests, cannot be conducted.

In the present embodiment, since the traveling process S4 is executed, the rotational speed N of the engine 19 is not limited. Accordingly, the forklift 10 is easily moved to a repair site, and inspections of the engine 19 are properly conducted.

Modifications

The present embodiment can be modified as follows. The present embodiment and the following modifications can be combined as long as the combined modifications remain technically consistent with each other.

In a case where the lift lever 24*a* continues to be operated to raise the fork 18 at the point in time when an anomaly related to the vehicle speed limiting process occurs, the standby process S53 may be a process in which the raising of the fork 18 is not permitted. For example, the standby process S53 may be a process in which the fork 18 is not raised at the point in time when an anomaly related to the vehicle speed limiting process occurs.

The standby process S53 may be executed only at the point in time when the raising prohibition process S52 is completed. The standby process S53 may be executed only at the point in time when an anomaly related to the vehicle speed limiting process occurs.

The fixed period of time Δt1 may be less than one second or may be greater than or equal to two seconds.

The material handling limitation process S5 may include the lowering non-limitation process, the raising permission process S51, and the raising prohibition process S52, and does not need to include the standby process S53. In this configuration, assuming that the operation of the lift lever 24*a* only causes the fork 18 to either rise or stop, the raising permission process S51 and the raising prohibition process S52 are executed alternately.

The material handling limitation process S5 may include the raising permission process S51 and the raising prohibition process S52, and does not need to include the lowering non-limitation process and the standby process S53. In this case, the material handling limitation process S5 may further include a lowering permission process and a lowering prohibition process.

In the lowering permission process, when the lift lever 24*a* is operated to lower the fork 18, the vehicle controller 31 sets the control valve 23 to the open state for a fixed period of time. In the lowering permission process, the vehicle controller 31 controls the control valve 23 to permit the discharge of hydraulic oil from the lift cylinder 16 for the fixed period of time, thereby lowering the fork 18. The fixed period of time in the lowering permission process is, for example, one second. The fixed period of time in the lowering permission process may be modified. For example, the fixed period of time is preferably set such that the lowering speed of the fork 18 corresponds to the speed at which the material loaded on the fork 18 does not shift.

In the lowering prohibition process, when the lift lever 24*a* is operated to lower the fork 18, the vehicle controller 31 sets the control valve 23 to the closed state for a fixed period of time. In the lowering prohibition process, the vehicle controller 31 prohibits the fork 18 from being lowered by controlling the control valve 23 to stop discharging hydraulic oil from the lift cylinder 16 for the fixed period of time. The lowering prohibition process is executed immediately after the lowering permission process. The fixed period of time in the lowering prohibition process is longer than the fixed period of time in the lowering permission process. The fixed period of time in the lowering prohibition process is, for example, five seconds. The fixed period of time in the lowering prohibition process may be modified if a sense of unease can be created in the material handling task when the operator intends to lower the fork 18. That is, the fixed period of time in the lowering prohibition process may be shorter than the fixed period of time in the lowering permission process.

The material handling limitation process S5 may only include the raising prohibition process S52. Instead, the material handling limitation process S5 may only include the lowering prohibition process.

The material handling limitation process S5 may include a backward tilt permission process and a backward tilt prohibition process.

In the backward tilt permission process, when tilting the fork 18 backward, the vehicle controller 31 tilts the fork 18 backward by controlling the control valve 23 to permit the supply of hydraulic oil to the tilt cylinder 15 for a fixed period of time.

The backward tilt prohibition process is executed immediately after the backward tilt permission process. In the backward tilt prohibition process, the vehicle controller 31 prohibits the fork 18 from being tilted backward by controlling the control valve 23 to stop supplying hydraulic oil to the tilt cylinder 15 for a fixed period of time.

The material handling limitation process S5 may include a forward tilt permission process and a forward tilt prohibition process.

In the forward tilt permission process, when tilting the fork 18 forward, the vehicle controller 31 tilts the fork 18 forward by controlling the control valve 23 to permit the discharge of hydraulic oil from the tilt cylinder 15 for a fixed period of time.

In the forward tilt prohibition process, the vehicle controller 31 prohibits the fork 18 from being tilted forward by controlling the control valve 23 to stop discharging hydraulic oil from the tilt cylinder 15 for a fixed period of time.

The material handling limitation process S5 may only include the backward tilt prohibition process. Alternatively, the material handling limitation process S5 may only include the forward tilt prohibition process. In the present embodiment and the modifications, the material handling limitation process S5 simply needs to limit the operation of the material handling device 11.

The controller 30 may be a single unit in which the vehicle controller 31 is integrated with the engine controller 32.

In the present embodiment, the vehicle speed limiting process in the material handling state may be omitted. In this case, the vehicle speed limiting process is executed only in the eco mode. In this case, the material handling limitation device 40 includes the accelerator sensor 35, vehicle speed sensor 36, and controller 30.

In the present embodiment, the vehicle speed limiting process in the material handling state only needs to be executed instead of the vehicle speed limiting process in the eco mode. In the present embodiment, the vehicle speed limiting process only needs to be executed based on at least the vehicle speed V.

The hydraulic pump 20 is driven by the engine 19. Instead, for example, the hydraulic pump 20 may be driven by a motor. In this case, for example, the hydraulic actuator may include the control valve 23, hydraulic pump 20, and motor. Alternatively, the hydraulic actuator may only include the motor. That is, the vehicle controller 31 may control the motor to regulate the amount of hydraulic oil supplied to the control valve 23 through the hydraulic pump 20.

The invention claimed is:

1. A material handling limitation device for a forklift, the forklift including an engine and a material handling device, the material handling limitation device comprising:

a vehicle speed sensor configured to output a signal corresponding to a vehicle speed of the forklift;

an accelerator sensor configured to output a signal corresponding to an operation amount of an accelerator pedal; and a processing circuitry configured to calculate the vehicle speed based on the signal from the vehicle speed sensor, and execute a vehicle speed limiting process that limits the vehicle speed based on at least the vehicle speed, wherein the processing circuitry is configured to execute, in a case where an anomaly related to the vehicle speed limiting process has occurred, a traveling process that controls a rotational speed of the engine based on the signal from the accelerator sensor without limiting the rotational speed of the engine so as to allow the forklift to travel at a vehicle speed corresponding to the operation amount of the accelerator pedal, and a material handling limitation process that limits operation of the material handling device.

2. The material handling limitation device according to claim 1, wherein the material handling device includes at least a lift device configured to vertically move a fork using hydraulic pressure, the lift device includes:

a lift cylinder configured to vertically move the fork; and a hydraulic actuator configured to control a flow rate of hydraulic oil supplied to and discharged from the lift cylinder, and the material handling limitation process includes a lowering non-limitation process that controls the hydraulic actuator so as not to limit discharge of the hydraulic oil from the lift cylinder when the fork is lowered.

3. The material handling limitation device according to claim 2, wherein the material handling limitation process further includes:

a raising permission process that raises the fork by controlling the hydraulic actuator such that supply of the hydraulic oil to the lift cylinder is permitted for a fixed period of time; and a raising prohibition process executed immediately after the raising permission process, wherein the raising prohibition process prohibits the fork from being raised by controlling the hydraulic actuator to stop supplying the hydraulic oil to the lift cylinder for a fixed period of time.

4. The material handling limitation device according to claim 3, wherein the forklift includes a lift lever configured to actuate the lift device, the material handling limitation process further includes a standby process, and the processing circuitry is configured to switch from the standby process to the raising permission process in a case where the lift lever starts to be operated to raise the fork during execution of the standby process.

5. The material handling limitation device according to claim 1, wherein the material handling device includes at least a lift device configured to vertically move a fork using hydraulic pressure, the lift device includes:

a lift cylinder configured to vertically move the fork; and a hydraulic actuator configured to control a flow rate of the hydraulic oil supplied to and discharged from the lift cylinder, and the material handling limitation process includes:

a raising permission process that raises the fork by controlling the hydraulic actuator such that supply of the hydraulic oil to the lift cylinder is permitted for a fixed period of time; and a raising prohibition process executed immediately after the raising permission process, wherein the raising prohibition process prohibits the fork from being raised by controlling the hydraulic actuator to stop supplying the hydraulic oil to the lift cylinder for a fixed period of time.

6. The material handling limitation device according to claim 4, wherein the standby process is executed at a point in time when an anomaly related to the vehicle speed limiting process occurs and at a point in time when the raising prohibition process is completed.

7. The material handling limitation device according to claim 6, wherein the standby process permits the fork to rise while the lift lever continues to be operated even if an anomaly related to the vehicle speed limiting process occurs when the fork is rising.

8. The material handling limitation device according to claim 3, wherein the fixed period of time in the raising permission process is shorter than a period of time from when the fork starts to rise to when a speed of the fork reaches a speed at which a material on the fork shifts.

9. A material handling limitation method for a forklift, the forklift including an engine and a material handling device, the material handling limitation method comprising:

calculating a vehicle speed of the forklift based on a signal corresponding to the vehicle speed;

executing a vehicle speed limiting process that limits the vehicle speed based on at least the vehicle speed; and executing, in a case where an anomaly related to the vehicle speed limiting process has occurred, a traveling process that controls a rotational speed of the engine based on a signal corresponding to an operation amount of an accelerator pedal without limiting the rotational speed of the engine so as to allow the forklift to travel at a vehicle speed corresponding to the operation amount of the accelerator pedal, and a material handling limitation process that limits operation of the material handling device.

10. A material handling limitation device for a forklift, the forklift including an engine and a material handling device, the material handling limitation device comprising:

a vehicle speed sensor configured to output a signal corresponding to a vehicle speed of the forklift;

an accelerator sensor configured to output a signal corresponding to an operation amount of an accelerator pedal; and a processing circuitry configured to calculate the vehicle speed based on the signal from the vehicle speed sensor, and execute a vehicle speed limiting process that limits the vehicle speed based on at least the vehicle speed, wherein the processing circuitry is configured to execute, in a case where an anomaly related to the vehicle speed limiting process has occurred, a traveling process that controls a rotational speed of the engine based on the signal from the accelerator sensor and a material handling limitation process that limits operation of the material handling device, the material handling device includes at least a lift device configured to vertically move a fork using hydraulic pressure, the lift device includes:

a lift cylinder configured to vertically move the fork; and a hydraulic actuator configured to control a flow rate of hydraulic oil supplied to and discharged from the lift cylinder, the material handling limitation process includes a lowering non-limitation process that controls the hydraulic actuator so as not to limit discharge of the hydraulic oil from the lift cylinder when the fork is lowered, and the material handling limitation process further includes:

a raising permission process that raises the fork by controlling the hydraulic actuator such that supply of the hydraulic oil to the lift cylinder is permitted for a fixed period of time; and a raising prohibition process executed immediately after the raising permission process, wherein the raising prohibition process prohibits the fork from being raised by controlling the hydraulic actuator to stop supplying the hydraulic oil to the lift cylinder for a fixed period of time.

* * * * *